United States Patent
Gonda et al.

[19]

[11] Patent Number: 5,850,514
[45] Date of Patent: Dec. 15, 1998

[54] MALFUNCTION MONITORING CIRCUIT OF MICROCOMPUTER SYSTEM

[75] Inventors: Tomohiko Gonda; Kunio Nakaguro, both of Kanagawa-ken, Japan

[73] Assignee: Nissan Motor Co., Ltd., Kanagawa-ken, Japan

[21] Appl. No.: 810,788

[22] Filed: Mar. 5, 1997

[30] Foreign Application Priority Data

Mar. 18, 1996 [JP] Japan .................................. 8-088914

[51] Int. Cl.$^6$ .......................................................... G06F 11/00
[52] U.S. Cl. .............................. 395/185.08; 395/185.04; 371/61
[58] Field of Search ......................... 395/185.04–185.09, 395/182.21; 371/61, 62

[56] References Cited

U.S. PATENT DOCUMENTS

| | | | |
|---|---|---|---|
| 3,866,184 | 2/1975 | Buhrke et al. | 395/185.04 |
| 3,909,795 | 9/1975 | Chang et al. | 395/185.08 |
| 4,586,179 | 4/1986 | Sirazi et al. | 395/182.2 |
| 4,803,682 | 2/1989 | Hara et al. | 395/182.21 |
| 4,835,671 | 5/1989 | Sato et al. | 364/186 |
| 4,879,647 | 11/1989 | Yazawa | 395/185.08 |
| 4,962,352 | 10/1990 | Ogawa | 324/73.1 |
| 5,054,023 | 10/1991 | Kronberg | 395/185.08 |
| 5,204,863 | 4/1993 | Saint-Joigny et al. | 395/185.08 |
| 5,341,497 | 8/1994 | Younger | 395/185.04 |
| 5,400,341 | 3/1995 | Makino et al. | 395/750.08 |
| 5,408,648 | 4/1995 | Gokan et al. | 395/182.21 |
| 5,528,756 | 6/1996 | Molnar | 395/185.08 |
| 5,563,799 | 10/1996 | Brehmer et al. | 364/481 |
| 5,567,560 | 10/1996 | Polis et al. | 395/182.21 |
| 5,644,702 | 7/1997 | Nishioka | 395/182.2 |
| 5,652,836 | 7/1997 | Park | 395/185.08 |
| 5,689,430 | 11/1997 | Ohno et al. | 364/483 |
| 5,694,336 | 12/1997 | Hirao | 364/551.01 |

FOREIGN PATENT DOCUMENTS

4-291634  10/1992  Japan .

*Primary Examiner*—Robert W. Beausoliel, Jr.
*Assistant Examiner*—Pierre Eddy Elisca
*Attorney, Agent, or Firm*—McDermott, Will & Emery

[57] ABSTRACT

A microcomputer malfunction monitoring system comprises a controlled unit, a microcomputer control unit for sending a system operation signal to the controlled unit, a reset IC having a watchdog function, and a detection circuit. The reset IC having a watchdog function comprises a watchdog timer circuit and a first voltage monitoring circuit. And the detection circuit comprises a second voltage monitoring circuit and an abnormality monitoring circuit. When clock signals which are output from the microcomputer control unit successively along with normal program processing cease, the watchdog timer circuit outputs short pulse signals at predetermined time intervals to reset the program processing of the microcomputer control unit until the clock signals are output again. The first voltage monitoring circuit outputs a long pulse signal when the power voltage E falls below a threshold value WD. The abnormality monitoring circuit detects the lengths of the pulse signals, counts only short pulse signals from the watchdog timer circuit, and outputs a malfunction detection signal to the controlled unit when the count number reaches a predetermined value. When a drop in power voltage E is detected by at least one of the first and second voltage monitoring circuits, in addition to a low voltage when power is turned on, the count value of the abnormality monitoring circuit is reset.

5 Claims, 4 Drawing Sheets

MALFUNCTION MONITORING CIRCUIT OF MICROCOMPUTER SYSTEM

BACKGROUND OF THE INVENTION

1. Field of the Invention

This invention relates to a microcomputer malfunction monitoring system for detecting an abnormality in the function of a microcomputer control circuit.

2. Description of the Prior Art

In general, more than ten microcomputer control units are installed in a vehicle, robot, machine tool, construction machine or the like in some ways. These microcomputer control units are connected to controlled units and a main control board (control panel) so that a signal indicative of normal operation or abnormal operation is transmitted from a microcomputer control unit to a controlled unit and the control panel. Each microcomputer control unit is provided with a watchdog timer circuit for detecting an abnormality in program processing and a voltage monitoring circuit for detecting an abnormality in power voltage.

The watchdog timer circuit detects clock signals which are output successively from a microcomputer control unit along with program processing and transmits a short pulse signal to the reset input terminal of the microcomputer control unit to reset the program processing of the microcomputer control unit when the omission of the clock signals or an abnormal clock frequency is detected. This short pulse signal is generally a signal having a pulse width of 2 µs or more.

The voltage monitoring circuit of the microcomputer control unit detects a power voltage and transmits a long pulse signal having a pulse width of 20 ms or more to the same reset input terminal to reset program processing when the detected power voltage is outside a predetermined range. Since it takes a slightly longer time for the microcomputer control unit to return to its normal operation in the case of abnormal power voltage than the case of a simple trouble in program processing, resetting is carried out with a long pulse signal.

However, when elements constituting the microcomputer control unit are destroyed or a stored program itself malfunctions, the function of the microcomputer control unit is not restored even by repeating resetting of program processing. In this case, it is necessary to cause the unit controlled by the microcomputer control unit to undertake appropriate fail-safe operation, or to report an abnormality in the microcomputer control unit to the main control board (control panel) connected to the microcomputer control unit.

Then, a detection circuit for counting pulse signals to be applied to the reset input terminal of the microcomputer control unit is provided to output a malfunction detection signal indicative of an abnormality in the microcomputer control unit when the number of times of resetting reaches a predetermined number.

This microcomputer malfunction monitoring system is described in JP-A 291634/1992 (the term "JP-A" as used herein means an "unexamined published Japanese patent application"), for example. In this prior art, a pulse signal to be applied to the reset input terminal is stored in a capacitor and a malfunction detection signal is output when the terminal voltage of the capacity exceeds a threshold value by continuous repetitions of resetting.

When the microcomputer control unit is reset by the voltage monitoring circuit, it is not necessary to add this resetting to the count number of times of resetting because power voltage is abnormal and there is no problem with the function of the microcomputer control unit itself. When an abnormality in the microcomputer control unit itself is detected, the microcomputer control unit is reset only by the watchdog timer circuit.

However, a microcomputer malfunction monitoring system disclosed in JP-A 291634/1992 involves such a problem that resetting by the voltage monitoring circuit and resetting by the watchdog timer circuit are confused. In addition, when one pulse signal output from the voltage monitoring circuit is input, a voltage equivalent to 5 to 6 short pulse signals output from the watchdog timer circuit is stored in the capacitor and exceeds a threshold value at a stretch. As a result, a malfunction detection signal is output in spite that there is no problem with the function of the microcomputer control unit.

SUMMARY OF THE INVENTION

In view of the above problems, it is an object of the present invention to provide a microcomputer malfunction monitoring system capable of detecting an abnormality in a microcomputer control unit with certainty without confusing it with an abnormality in power voltage.

To attain the above object, the inventors of the present invention have first attempted to provide in the detection circuit a discharge circuit for discharging a voltage accumulated in a capacitor by comparing a power voltage with a predetermined threshold value and reset the count number of pulse signals by nullifying the accumulated voltage when the power voltage falls below the threshold value. When a long pulse signal is transmitted from the voltage monitoring circuit, the capacitor is bypassed to the ground potential in advance and hence, resetting by the voltage monitoring circuit is not counted. However, in this case, it has been found that the detection circuit 35 malfunctions if the threshold value of the voltage monitoring circuit and the threshold value of the detection circuit differ from each other. For instance, the following defect has been found. For instance, when the threshold value of the detection circuit is lower than the threshold value of the voltage monitoring circuit and the power voltage falls to an intermediate value between the two threshold values, the capacitor is not bypassed and a long pulse signal is stored in the capacitor even if the long pulse signal is transmitted from the voltage monitoring circuit with the result that the power voltage exceeds the threshold value. After such preliminary experiments have been further studied, the present invention described below has been accomplished.

The present invention comprises a controlled unit, a microcomputer control unit connected to the controlled unit, a reset IC having a watchdog function connected to the microcomputer control unit, and a detection circuit. The reset IC comprises a watchdog timer circuit for detecting pulse signals which are output from the microcomputer control unit successively along with program processing and transmitting a first pulse signal to the reset input terminal of the microcomputer control unit to reset the program processing when an abnormality is detected and a first voltage monitoring circuit for detecting a change in power voltage and transmitting a second pulse signal longer than the first pulse signal to the reset input terminal to reset the program processing when the detected power voltage is outside a predetermined range. The first and second pulse signals are preferably falling pulses, or negative polarity pulses as shown line graphs (c) in FIGS. 2 to 4. The detection circuit outputs a malfunction detection signal when the abnormality indicated by the first pulse signal is not canceled even by repeating resetting of the program processing. According to the feature of the present invention, the detection circuit resets its count value when the power supply is turned on, counts only the first pulse signals by detecting the length of each pulse signal, and can output the malfunction detection signal only when its count value of the first pulse signals reaches a predetermined value.

This detection circuit is preferably constituted such that it resets its count value when it detects that the microcomputer control circuit is powered on at a start of the system operation. Since the detection circuit does not count the second pulse signals by discriminating the length of each pulse signal, only the first pulse signals from the watchdog timer circuit are counted after the count value is reset by power-on operation or the like. Therefore, the second pulse signals from the voltage monitoring circuit are not counted.

Further, this detection circuit is preferably constituted such that it detects a change in power voltage during operation and resets the count value of the first pulse signals even when the detected power voltage falls below a predetermined threshold value. In this case, it is more preferred that the detection circuit has a second power voltage monitoring circuit to detect a change in power voltage itself, independent from the first voltage monitoring circuit. When the power voltage falls below the predetermined threshold value, it is possible that the program processing of the microcomputer control unit will be interfered, the watchdog timer circuit will malfunction, which causes the first pulse signal to be output, or the detection circuit itself will malfunction, which causes the erroneous counting of the first pulse signals. Then, when the power voltage falls below the predetermined threshold value, the count value of the first pulse signals is reset to clear the count value which may be influenced by a drop in power voltage, and a malfunction detection signal is output only with a count value derived from an abnormality in the microcomputer control unit.

Preferably, the detection circuit resets the count value of the first pulse signals even at the rising edge of the second pulse signal. Here, the rising edge is defined for the negative polarity pulse. For positive polarity pulse, "the rising edge" should be read as "the falling edge". When it is judged by the voltage monitoring circuit that the power voltage is abnormal, the detection circuit resets the count value of the first pulse signals to clear the count value which may be influenced by a drop in power voltage so that it can output a malfunction detection signal only with a count value derived from an abnormality in the microcomputer control unit. Since the count value of the first pulse signals is reset when a drop in power voltage is detected by the second voltage monitoring circuit in the detection circuit and when it is judged by the first voltage monitoring circuit that the power voltage is abnormal, the count value of the first pulse signals never reaches a predetermined value by an erroneous counting operation (such as the malfunction of elements or the count value of noise pulses) caused by a drop in power voltage.

The detection circuit of the present invention may be composed of an edge detection circuit for detecting the rising edges and falling edges of a first pulse signal and a second pulse signal, a timer in which a time duration longer than the first pulse signal and shorter than the second pulse signal is set and which is activated at the falling edge, a counter for incrementing the count value of the first pulse signals by one when the falling edge is detected within the time duration set in the timer, and a reset circuit for resetting the count value of the counter when the rising edge is detected after the passage of the time duration set in the timer (The rising and falling edges are defined for negative polarity pulses). Thus, the provision of this detection circuit makes it possible to detect the length of each pulse signal and discriminate the first pulse signal from the second pulse signal. When the rising edge of a pulse appears within a predetermined time from the falling edge of the pulse signal, the pulse signal is identified as the first pulse signal and the count value of the counter is incremented by one. In other words, when the rising edge of a pulse signal appears after the passage of the predetermined time from the falling edge of the pulse signal, the pulse signal is identified as the second pulse signal and the counter is reset.

Other and further objects and features of the present invention will become obvious upon an understanding of the illustrative embodiment about to be described in connection with the accompanying drawings or will be indicated in the appended claims, and various advantages not referred to herein will occur to one skilled in the art upon employing of the invention in practice.

DETAILED DESCRIPTION OF THE EMBODIMENT

An embodiment of the present invention will be described with reference to the accompanying drawings. It is to be noted that the same or similar reference numerals are applied to the same or similar parts and elements throughout the drawings, and the description of the same or similar parts and elements will be omitted or simplified.

Figure 1:
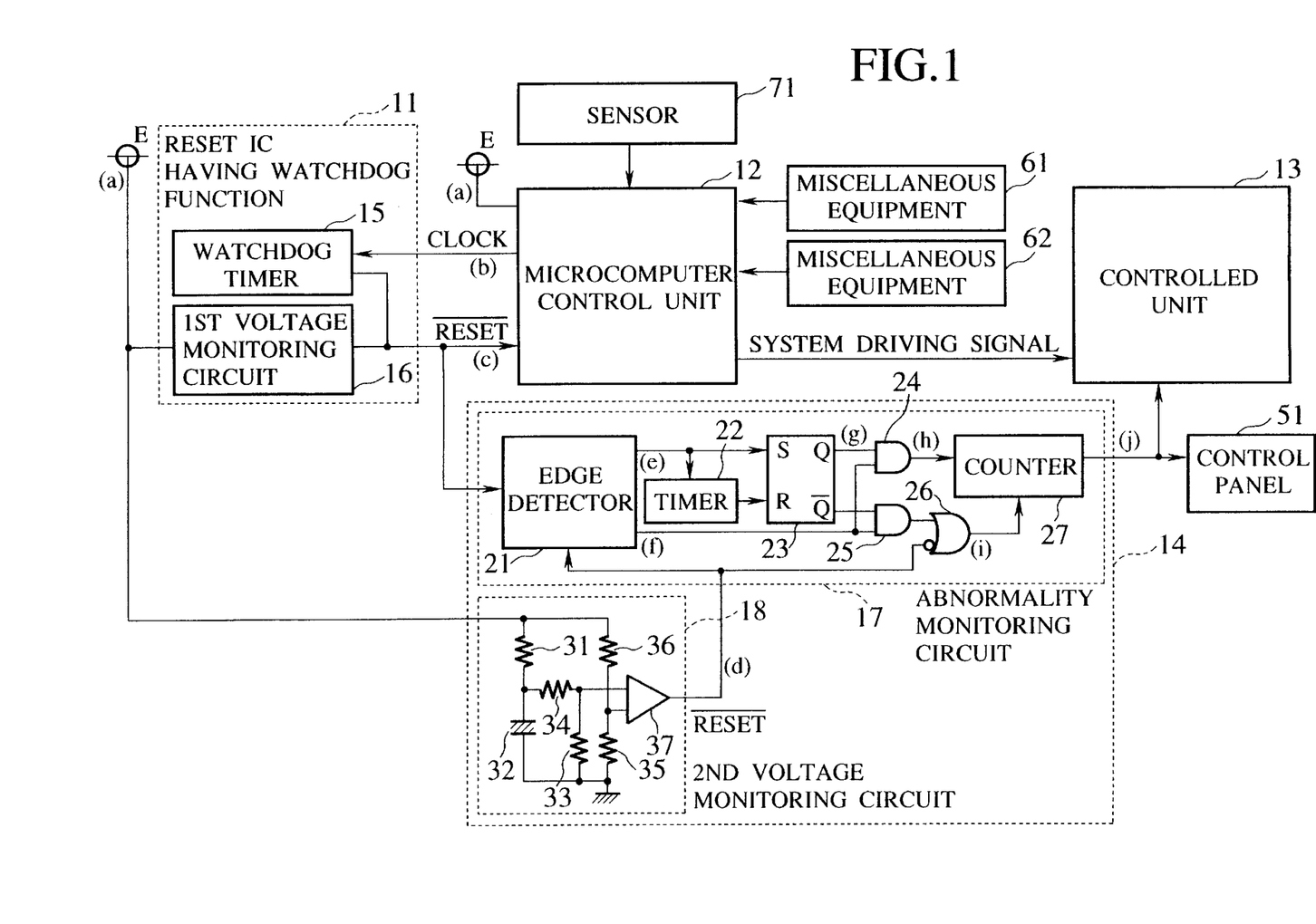
FIG. 1 is a diagram for explaining the constitution of a microcomputer malfunction monitoring system according to an embodiment of the present invention.
Figure 2:
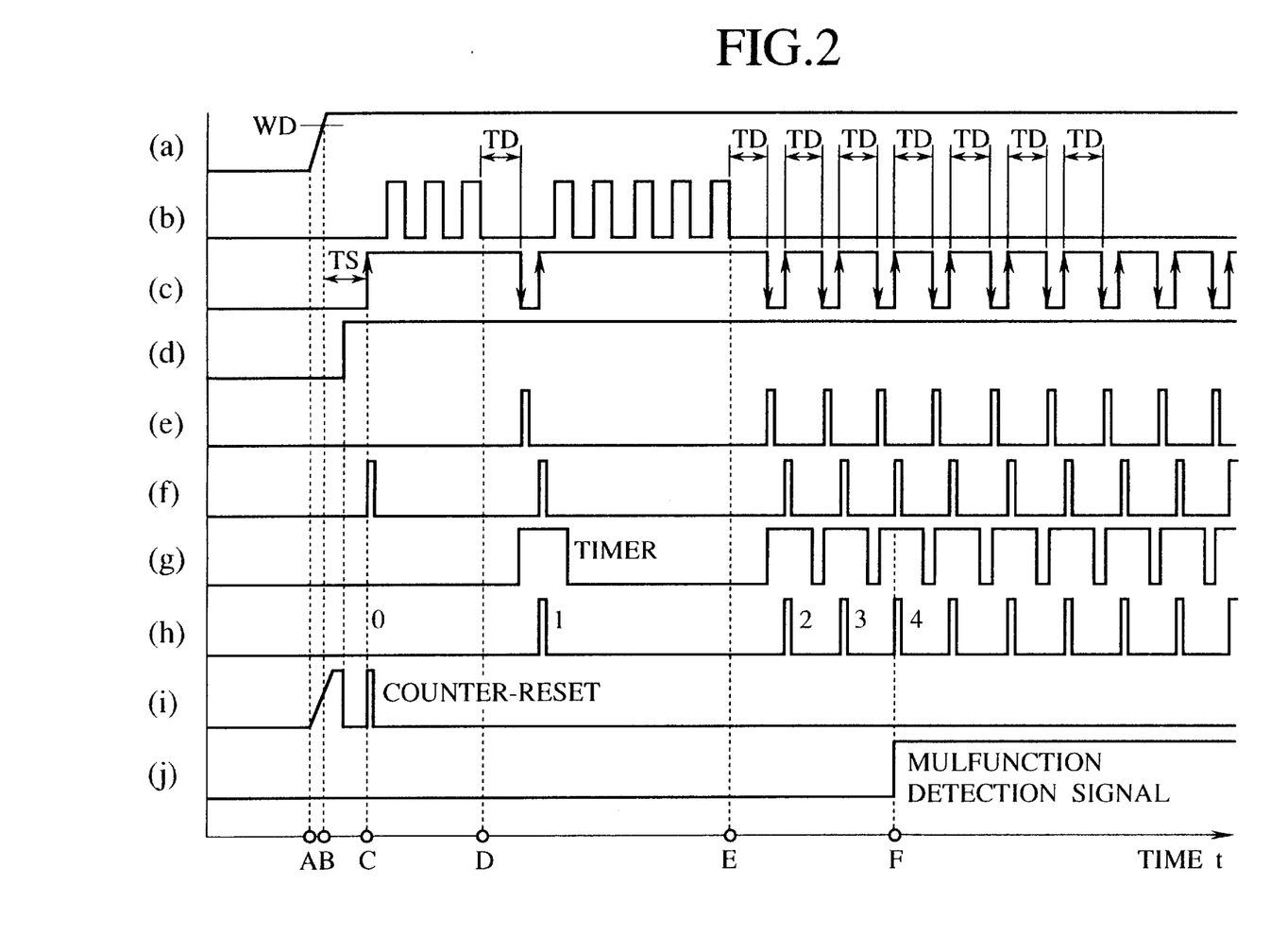
FIG. 2 is a timing chart for explaining the counting of the number of times of resetting by a watchdog timer circuit of the system shown in FIG. 1.
Figure 3:
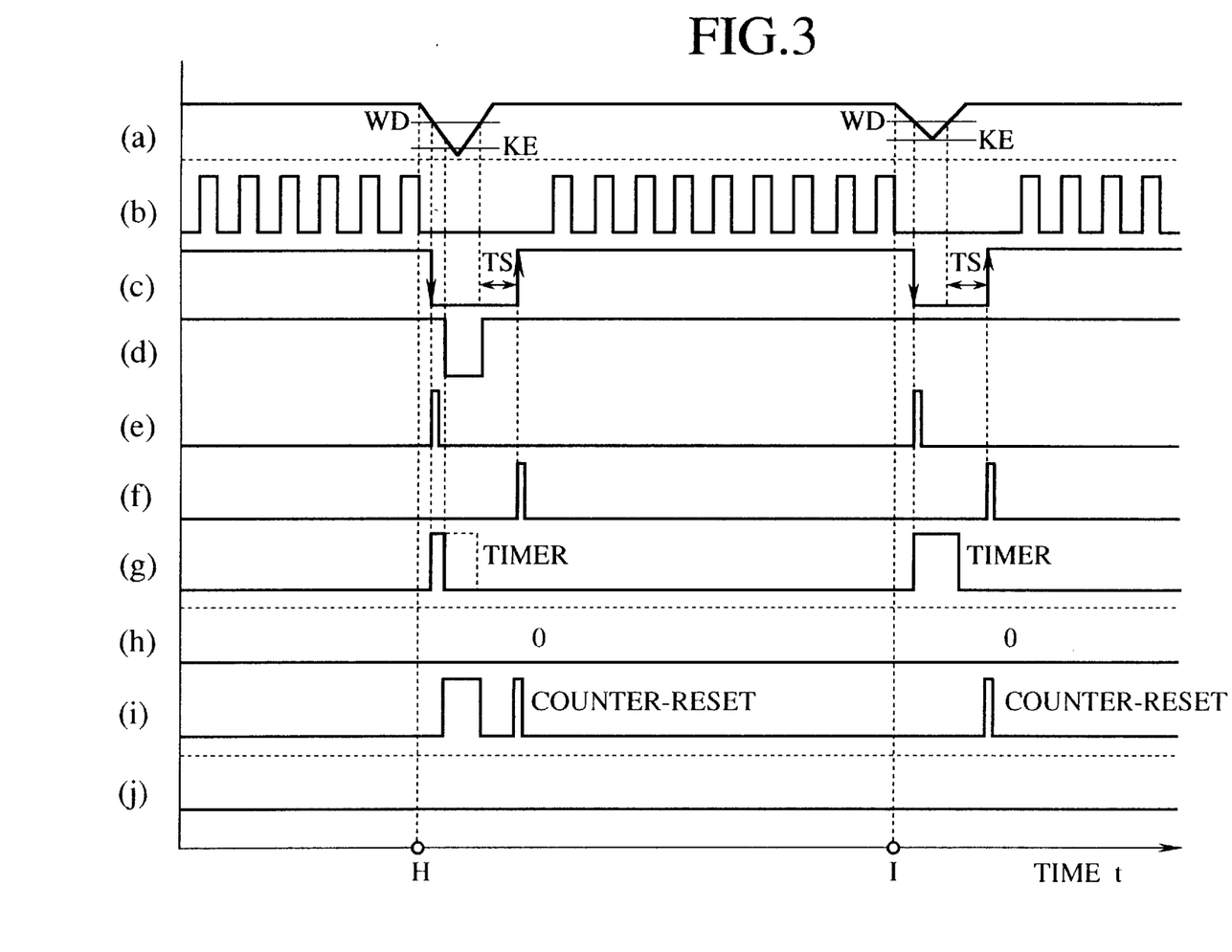
FIG. 3 is a timing chart for explaining the operation of the system when power voltage drops under the condition that WD is higher than KE in the system shown in FIG. 1.
Figure 4:
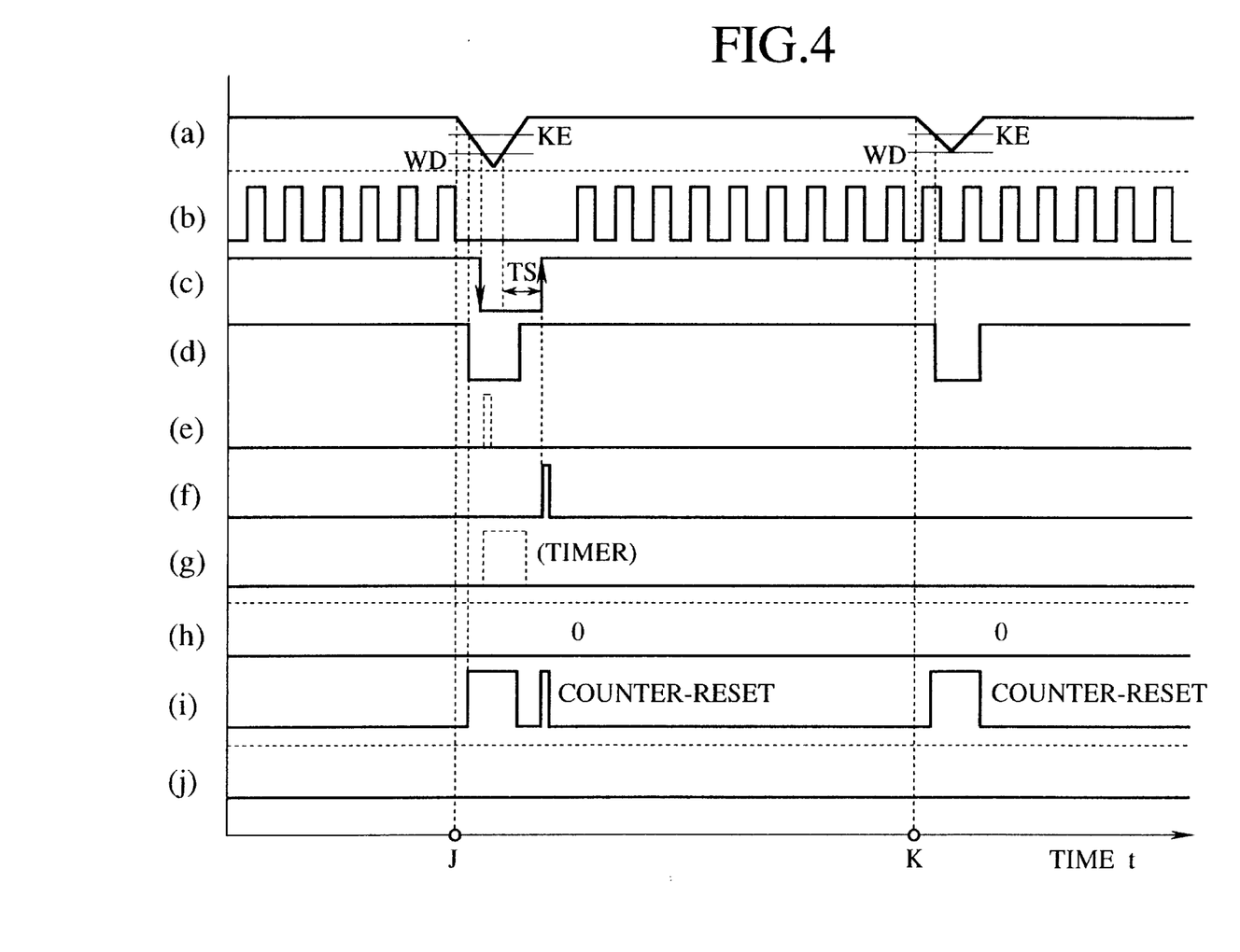
FIG. 4 is a timing chart for explaining the operation of the system when power voltage drops under the condition that WD is lower than KE in the system shown in FIG. 1.

With reference to FIGS. 1 to 4, a microcomputer malfunction monitoring system according to the present invention will be described. FIG. 1 is a diagram for explaining the constitution of the microcomputer malfunction monitoring system, FIG. 2 is a timing chart for explaining counting of the number of times of resetting by the watchdog circuit, and FIGS. 3 and 4 are timing charts for explaining the operation of the system when power voltage drops. Voltage variations at locations (a) to (j) in FIG. 1 are shown in line graphs (a) to (j) of FIG. 2. Similarly, voltage variations at locations (a) to (j) in FIG. 1 are shown in line graphs (a) to (j) of FIGS. 3 and 4. The line graphs (a) to (j) of FIG. 2 are referred to as FIG. 2(a) to FIG. 2(j), respectively, in the following description. The same is applied to FIGS. 3 and 4.

In the embodiment of the present invention, a large number of microcomputer control units installed in a vehicle are each provided with a reset IC 11 having a watchdog function and a detection circuit 14 as shown in FIG. 1. The detection circuit 14 outputs a malfunction detection signal (j) to a controlled unit 13 when the microcomputer control unit 12 does not return to its normal operation even if operation even if the reset IC 11 having a watchdog function repeats resetting of the microcomputer control unit 12 a predetermined number of times, e.g., four times. Then, the controlled unit 13 intercepts control by the microcomputer control unit 12 and proceeds to a predetermined fail-safe operation. The malfunction detection signal (j) is also sent to a control panel 51 and an abnormality in the microcomputer control unit 12 is displayed on the control panel 51.

The reset IC 11 having a watchdog function may be used as a general-purpose product in which a watchdog timer circuit 15 and a first voltage monitoring circuit 16 are housed in one package, which is arranged outside the microcomputer control unit 12 and operates independently.

The watchdog timer circuit 15 detects clock signals which are output successively from the microcomputer control unit 12 as shown in FIG. 2(b) and transmits a short falling pulse signal which is "a first pulse signal" to the reset input terminal of the microcomputer control unit 12 as shown in FIG. 2(c) to reset program processing when the omission of the clock signals or an abnormal frequency is detected. The output of the watchdog timer circuit 15 is normally (or stationary) high (H) level. And the first pulse signal is a negative polarity pulse designating "1" by low (L) level.

Where power voltage is within a normal range, program processing can be started immediately after initializing a register or the like of the microcomputer control unit 12. Therefore, program processing can be reset with a short falling pulse signal (first pulse signal c) having a time duration of about 2 μs.

The first voltage monitoring circuit 16 detects a change in power voltage E shown in FIG. 2(a) and transmits a long falling pulse signal (c) which is "a second pulse signal" as shown in FIG. 3(c) to the same reset input terminal of the microcomputer control unit 12 to reset program processing when power voltage E is outside the predetermined range. The predetermined range of the power voltage E differs depending on type of an electronic control unit but may be set to 3 to 4.5 V, for example. Upon a first rise in power voltage E immediately after the power voltage as shown in FIG. 2(a) is supplied at a start of the microcomputer system or upon a drop in power voltage E caused by some factor during operation as shown in FIG. 3(a) and FIG. 4(a), it is necessary to suspend program processing until an oscillation circuit made of quartz or the like in the microcomputer control unit 12 is stabilized. Therefore, program processing is reset with a long falling pulse signal having a time duration of about 20 ms as shown in FIG. 2(c), FIG. 3(c) and FIG. 4(c).

The microcomputer control unit 12 forms a system driving signal every moment with reference to the outputs of other miscellaneous equipments 61, 62, . . . and a sensor 71 and transmits it to the controlled unit 13 as shown in FIG. 1. For instance, like a brake controller for controlling a brake unit or an audio controller for controlling a plurality of car audio units, the microcomputer control unit 12 transmits a system driving signal according to a program stored in the memory of the microcomputer control unit to control the operation of the controlled unit 13 totally. A clock signal rising step and a clock signal falling step are inserted at predetermined positions of the program. If normal program processing is executed, clock signals having an equal length are applied to the reset IC 11 having a watchdog function at almost fixed time intervals.

The detection circuit 14 is composed of an abnormality monitoring circuit 17 for adding up the number of times of resetting by the watchdog timer circuit 15 and determining that the microcomputer control circuit 12 malfunctions when the number of times of resetting exceeds a predetermined number and a second voltage monitoring circuit 18 for resetting the abnormality monitoring circuit 17 when power voltage falls below a predetermined threshold value KE.

To the reset input terminal of the microcomputer control unit 12 are applied both short falling pulse signals as shown in FIG. 2(c) which are the first pulse signals from the watchdog timer circuit 15 and long falling pulse signals as shown in FIG. 3(c) and FIG. 4(c) which are second pulse signals from the first voltage monitoring circuit 16. The abnormality monitoring circuit 17 excludes signals corresponding to the long falling pulse signals, counts only signals corresponding to the short falling Pulse signals and outputs a malfunction detection signal (j) to the controlled unit 13 and the control panel 51 when the count number of the pulse signals reaches a predetermined number, e.g., four.

An edge detection circuit 21 detects the rising edges and falling edges of the first and second pulse signals (c) from the reset IC 11 having a watchdog function. A short pulse (e) is formed at the falling edge of the first pulse signal (c) as shown in FIGS. 2(e) and 3(e) and is applied to the set terminal S of a flip-flop 23. By the short pulse (e) applied to the set terminal S, the output Q of the flip-flop 23 is inverted from an L level to an H level as shown in FIG. 3(g). At the rising edge of the first pulse signal (c), a short pulse (f) is formed as shown in FIGS. 2(f), 3(f) and 4(f) and applied to AND gates 24 and 25.

A time duration set in the timer 22 is an intermediate between the length of the short falling pulse signal (first pulse signal) from the watchdog timer circuit 15 and the length of the long falling pulse signal (second pulse signal) from the first voltage monitoring circuit 16. Stated more specifically, the time duration is set to an intermediate value between the length of the first short pulse signal from the watchdog timer circuit 15 and a wait time TS during which a reset state is continued when the power voltage E exceeds a threshold value WD to be described later and returns to its original value. For example, when the wait time TS is 180 ms, the control time of the timer 22 may be set to 21 ms.

The timer 22 is activated upon each falling edge of the falling pulse signal (c). After the passage of the time duration set in the timer 22 (timer counts up), a short pulse is applied to the reset terminal R of the flip-flop 23. Then, the output Q of the flip-flop 23 is inverted from an H level to an L level as shown in FIGS. 2(g) and 3(g). In the case of a short falling pulse signal (c), since the edge detection circuit 21 detects the rising edge of the pulse signal (c) before the timer 22 counts up, a pulse (f) corresponding to the rising edge of the falling pulse signal (c) passes through the AND gate 24 to become a pulse (h) which is then applied to the counter 27 as shown in FIG. 2(h). The counter 27 counts the pulses (h) and outputs a malfunction detection signal (j) as shown in FIG. 2(j) when its count value becomes 4.

The count value of the counter 27 is reset when the output (i) of an OR gate 26 becomes an H level. That is, the counter 27 is reset when the first voltage monitoring circuit 16 detects an abnormality in power voltage E and the output of the AND gate 25 becomes an H level and is applied to the OR gate 26 or when the second voltage monitoring circuit 18 judges that the power voltage E is below a threshold value KE and applies an L level output (d) for resetting the abnormality monitoring circuit 17 to the inversion input terminal of the OR gate 26.

The output $\overline{Q}$ to be applied to the AND gate 25 from the flip-flop 23 is an inverted value of output Q. When the timer 22 counts up, the output Q becomes an L level as shown in FIG. 2(g), and the output $\overline{Q}$ returns to an H level. Therefore, in the case of a long falling pulse signal (c) from the first voltage monitoring circuit 16 of the reset IC 11 having a watchdog function, the rising edge of the falling pulse signal (c) is detected after the output $\overline{Q}$ returns to an H level when the timer 22 counts up and a pulse (f) is then output from the edge detection circuit 21. This pulse (f) passes through the AND gate 25 and the OR gate 26 to become a counter reset pulse (i) to reset the counter 27.

The comparator 37 of the second voltage monitoring circuit 18 compares a detected voltage obtained by dividing the power voltage E by resistors 36 and 35 with a reference voltage stored in a capacitor 32 obtained by dividing the power voltage by resistors 31, 34 and 33. The comparator 37 fixes its output to an L level immediately when the detected voltage falls below the reference voltage and fixes its output to an H level after a predetermined time period which is shorter than the wait time TS as shown in FIG. 3,4(d) when the detected voltage exceeds the reference voltage.

Suppose that the key switch of a vehicle is operated at a time A to turn on the power supply and the power voltage E rises as shown in FIG. 2(a). The first voltage monitoring circuit 16 cancels resetting of the microcomputer control unit 12 in response to a pulse (c) shown in FIG. 2(c) after the passage of the wait time TS from a time B when the power voltage exceeds a threshold value WD. As a result, the program processing of the microcomputer control unit 12 is started and clock signals (b) are applied to the watchdog timer circuit 15 as shown in FIG. 2(b). The short falling pulse signal (c) which is the output of the watchdog timer circuit 15 is applied to the edge detection circuit 21. At the same time, when the rising edge of the long pulse signal (c) from the first power monitoring circuit 16 is detected by the abnormality monitoring circuit 14, the pulses (f) and (i) are formed as shown in FIG. 2(f) and FIG. 2(i), and the count value of the counter 27 is reset at a time C.

Then suppose that the program processing of the microcomputer control unit 12 runs recklessly at a time D and clock signals (b) cease. The watchdog timer circuit 15 transmit a short falling pulse signal to the microcomputer control unit 12 as shown in FIG. 2(c) to reset the program processing because a clock signal (b) is not detected after a time duration TD. At this point, if the microcomputer control unit 12 returns to its normal operation within the time duration TD, as shown in FIG. 2(b), the sending of clock signals is resumed.

Then suppose that a program is destroyed at a time E and clock signals from the microcomputer control unit 12 cease again. At this point, if the microcomputer control unit 12 does not return to its normal operation even by repeating the same resetting operation as that at the time D, the watchdog timer circuit 15 transmits a new falling pulse signal (c) each time the time duration TD passes from a rise in the pulse signal as shown in FIG. 2(c).

Since these falling pulse signals (c) are short falling pulse signals from the watchdog timer circuit 15, as shown in FIG. 2(g), a rising edge is detected by the edge detection circuit 21 within a time period from the time when the timer 22 counts up to the time when the output Q becomes an L level, and a pulse (f) shown in FIG. 2(f) is output. As a result, a pulse (h) corresponding to the rising edge shown in FIG. 2(h) is applied by the AND gate 24 to the counter 27. The counter 27 starts counting the number of pulse signals (h) in response to the pulse (i) after its count value is reset at a time C and outputs a malfunction detection signal (j) at a time F when its count value becomes 4. The malfunction detection signal (j) is applied to the controlled unit 13 and the control panel 51.

FIGS. 3 and 4 show how the detection circuit 14 functions when the power voltage E drops during operation. FIG. 3 shows the case where the threshold value KE of the second monitoring circuit 18 is lower than the threshold value WD of the first voltage monitoring circuit 16 and FIG. 4 shows the case where the threshold value KE of the second monitoring circuit 18 is higher than the threshold value WD of the first voltage monitoring circuit 16.

A description is first given of the case where KE is lower than WD. As shown in a left side portion of FIG. 3(a), suppose that, after the power voltage begins to drop at a time H and falls below a threshold value WD, it further falls below a threshold value KE and then rises to its original level. The first voltage monitoring circuit 16 cancel resetting of program processing after the function of the microcomputer control unit 12 is stabilized as descried above. The long falling pulse signal from the first voltage monitoring circuit 16 drops concurrently with the power voltage E's falling below the threshold value WD as shown in FIG. 3(c). The long falling pulse (c) does not rise before the passage of a predetermined wait time TS even when the power voltage E rises again and exceeds the threshold value WD, and does not cancel the resetting. The length of the long falling pulse signal (c) from the first voltage monitoring circuit 16 changes according to a time period during which the power voltage E is below the threshold value WD but is never shorter than the predetermined wait time TS as shown in FIG. 3(c).

When the power voltage E falls below the threshold value KE, the states of signals in the detection circuit 14 become unstable. At this point, the second voltage monitoring circuit 18 outputs a falling pulse signal (d) as shown in FIG. 3(d) and resets the counter 27 of the abnormality monitoring circuit 17 through the OR gate 26 when the signal becomes an L level. The second voltage monitoring circuit 18 generates an L level output (d) concurrently with the power voltage E's falling below the threshold value KE and an H level output (d) a little after the power voltage E exceeds the threshold value KE. The counter 27 of the abnormality monitoring circuit 17 is also reset by a pulse (f) at the rising edge of the long falling pulse signal (c) shown in FIG. 3(c) after the falling pulse signal (d) generated at the time that the power voltage E falls below the threshold value KE (see, FIG. 3(i)).

Then suppose that, as shown in a right side portion of FIG. 3(a), the power voltage E begins to drop at a time I, falls below the threshold value WD and rises to its original level right without falling further below the threshold value KE. In this case, since the power voltage E does not fall below the threshold value KE, the counter 27 of the abnormality monitoring circuit 17 is not reset by the second voltage monitoring circuit 18 as shown in FIG. 3(d), but is reset by a pulse (i) generated by a pulse (f) corresponding to the rising edge of the pulse signal (c) of the first voltage monitoring circuit 16 as shown in FIG. 3(c), FIG. 3(f) and FIG. 3(i).

A description is subsequently given of the case where KE is higher than WD with reference to FIG. 4. First suppose that the power voltage E begins to drop at a time J, falls below the threshold value KE, and further falls below the threshold WD which is lower than KE and then rises to its original level as shown in a left side portion of FIG. 4(a). In this case, as shown in FIG. 4(d), since the second voltage monitoring circuit 18 resets the edge detection circuit 21 before the power voltage E falls below the threshold value WD, the timer 22 is not activated. However, as shown in FIG. 4(c) and FIG. 4(d), since the long falling pulse signal (c) from the first voltage monitoring circuit 16 rises after resetting by the second voltage monitoring circuit 18 is canceled, the edge detection circuit 21 outputs a pulse (f) corresponding to the rising edge of this pulse signal as shown in FIG. 4(f). Therefore, after the counter 27 of the abnormality monitoring circuit 17 is reset when the output (d) of the second voltage monitoring circuit 18 shown in FIG. 4(d) and FIG. 4(i) becomes an L level, it is also reset by pulses (f) and (i) corresponding to the rising edge of the long falling pulse signal of the first voltage monitoring circuit as shown in FIG. 4(c), FIG. 4(f) and FIG. 4(i).

Then suppose that, as shown in a right side portion of FIG. 4(a), the power voltage E begins to drop at a time K, falls below the threshold value KE and then rises to its original level without falling below the threshold value WD. In this case, as shown in the right side portion of FIG. 4(c), since a long falling pulse signal as shown in the left side portion of FIG. 2(c) or FIG. 4(c) is not output from the first voltage monitoring circuit 16, the microcomputer control unit 12 is not reset and clock signals as shown in FIG. 4(b) do not cease. A rising edge is not detected by the edge detection circuit 21 and the timer 22 is not activated. However, the counter 27 of the abnormality monitoring circuit 17 is reset by a counter reset pulse (i) corresponding to the output (d) of the second voltage monitoring circuit 18 as shown in FIG. 4(d) and FIG. 4(i). The counter 27 is continued to be reset during which the output of the second voltage monitoring circuit 18 becomes an L level immediately after the power voltage E falls below the threshold value KE until a predetermined time period passes (which is shorter than the wait time TS) from the time the power voltage E rises again and exceeds the threshold value KE.

According to the microcomputer malfunction monitoring system of the embodiment of the present invention, since the abnormality monitoring circuit 17 discriminates the lengths of the first and second pulse signals and only the number of pulse signals (h) derived from the short falling pulse signals (c) which are the first pulse signals from the watchdog timer circuit 15 is counted, an abnormality in the microcomputer control unit 12 or the program can be detected accurately without confusing it with an abnormality in the power voltage E.

Since the counter 27 is reset when the power voltage E falls below the threshold value WD of the first voltage monitoring circuit 16 and when the power voltage E falls below the threshold value KE of the second voltage monitoring circuit 18 in addition to the time of starting the microcomputer control unit 12 (the time of turning on the power supply as shown in a left end portion of FIG. 2(a)), there is no fear that an unnecessary malfunction detection signal connected with an abnormality in the power voltage E is output. For instance, when the power voltage E is abnormal, even if there is no abnormality in the elements constituting the microcomputer control unit 12 and the program stored in the memory of the microcomputer control unit, the first pulse signal may be output by the erroneous operation of the watchdog timer circuit 15. When the microcomputer control unit 12 malfunctions due to an abnormality in the power voltage E, the watchdog timer circuit 15 outputs the first pulse signal. Even in the case where the microcomputer control unit itself is not abnormal like this, the present invention can prevent an unnecessary malfunction detection signal from being generated in the following manner. That is, in the microcomputer malfunction monitoring system according to the embodiment of the present invention, since a change in the power voltage E is detected and the counter 27 is reset by a signal (i) corresponding to the second pulse signal, the first pulse signals caused by a failure in the power voltage E are not counted. Further, the noise signals in the abnormality monitoring circuit 17 caused by an abnormality in the power voltage E are not counted either.

As described above, only the short falling pulse signals (first pulse signals) of the watchdog timer circuit 15 directly caused by an abnormality in the microcomputer control unit 12 or the program are counted correctly. Therefore, even if an abnormality in the power voltage E is caused by a drop in battery voltage or a short circuit of the motor, the controlled unit 13 does not start unnecessary fail-safe operation and the abnormality in the microcomputer control unit 12 is not displayed on the control panel. Consequently, according to the present invention, where a large number of microcomputer control units are installed in a vehicle, the maneuvability of the vehicle is not impaired unnecessarily during operation. In addition, the reliability's of the fail-safe operation and the display of the control panel are highly secured.

Further, according to the present invention, since the counter 27 is reset when the power voltage E falls below at least one of the threshold values WD and KE, as shown in FIGS. 3 and 4, there is no fear that the count value of the counter 27 is changed by the relationship between the threshold values WD and KE or the difference therebetween. Therefore, even if automobiles, car equipments or elements are different, an abnormality in the microcomputer control unit 12 or the program is always evaluated based on the same criteria and the reliability of the detection circuit 14 is not impaired.

Various modifications will become possible for those skilled in the art after receiving the teachings of the present disclosure without departing from the scope thereof.

What is claimed is:

1. A malfunction monitoring circuit comprising:
   (a) a controlled unit;
   (b) a microcomputer control unit having a reset terminal and outputting (i) a control signal to said controlled unit, and (ii) pulse signal successively;
   (c) a watchdog timer circuit for applying a first pulse signal to the reset terminal of said microcomputer control unit to reset said microcomputer control unit when the frequency or cycle of the pulse signals becomes abnormal;
   (d) a first voltage monitoring circuit for applying a second pulse signal longer than the first pulse signal to the reset terminal of said microcomputer control unit to reset said microcomputer control unit when power voltage supplied to said microcomputer control unit becomes abnormal; and
   (e) a detection circuit for identifying the first pulse signal by comparing the lengths of the first pulse signal and the second pulse signal with a predetermined value, counting only pulse signals identified as the first pulse signals and applying a malfunction detection signal to said controlled unit for causing said controlled unit to carry out a fail-safe operation when its counted number exceeds a predetermined number.

2. The malfunction monitoring circuit of claim 1, wherein said detection circuit detects a change in power voltage when power is supplied to said microcomputer control unit initially and reset the count value of pulse signals identified as the first pulse signal.

3. The malfunction monitoring circuit of claim 1, wherein said detection circuit has a second voltage monitoring circuit for detecting a change in power voltage and resets the count value of pulse signals identified as the first pulse signal when the power voltage falls below a predetermined threshold value.

4. The malfunction monitoring circuit of claim 3, wherein said detection circuit resets the count value of pulse signals identified as the first pulse signal upon the rising edge of the second pulse signal.

5. The malfunction monitoring circuit of claim 3, wherein said detection circuit comprising:

an edge detection circuit for detecting the rising edges and falling edges of the first pulse signal and the second pulse signal;

a timer in which a time duration longer than the pulse width of the first pulse signal and shorter than the pulse width of the second pulse signal is set and which is activated by the falling edge;

a counter for incrementing the count value of pulse signals identified as the first pulse signal by one when the rising edge is detected within the time duration set in said timer; and a reset circuit for resetting the count value of pulse signals identified as the first pulse signal when the rising edge is detected after the passage of the time duration set in said timer.

* * * * *